Aug. 25, 1931. H. D. GEYER 1,820,220
STEERING WHEEL AND SHAFT ASSEMBLY
Filed July 2, 1928
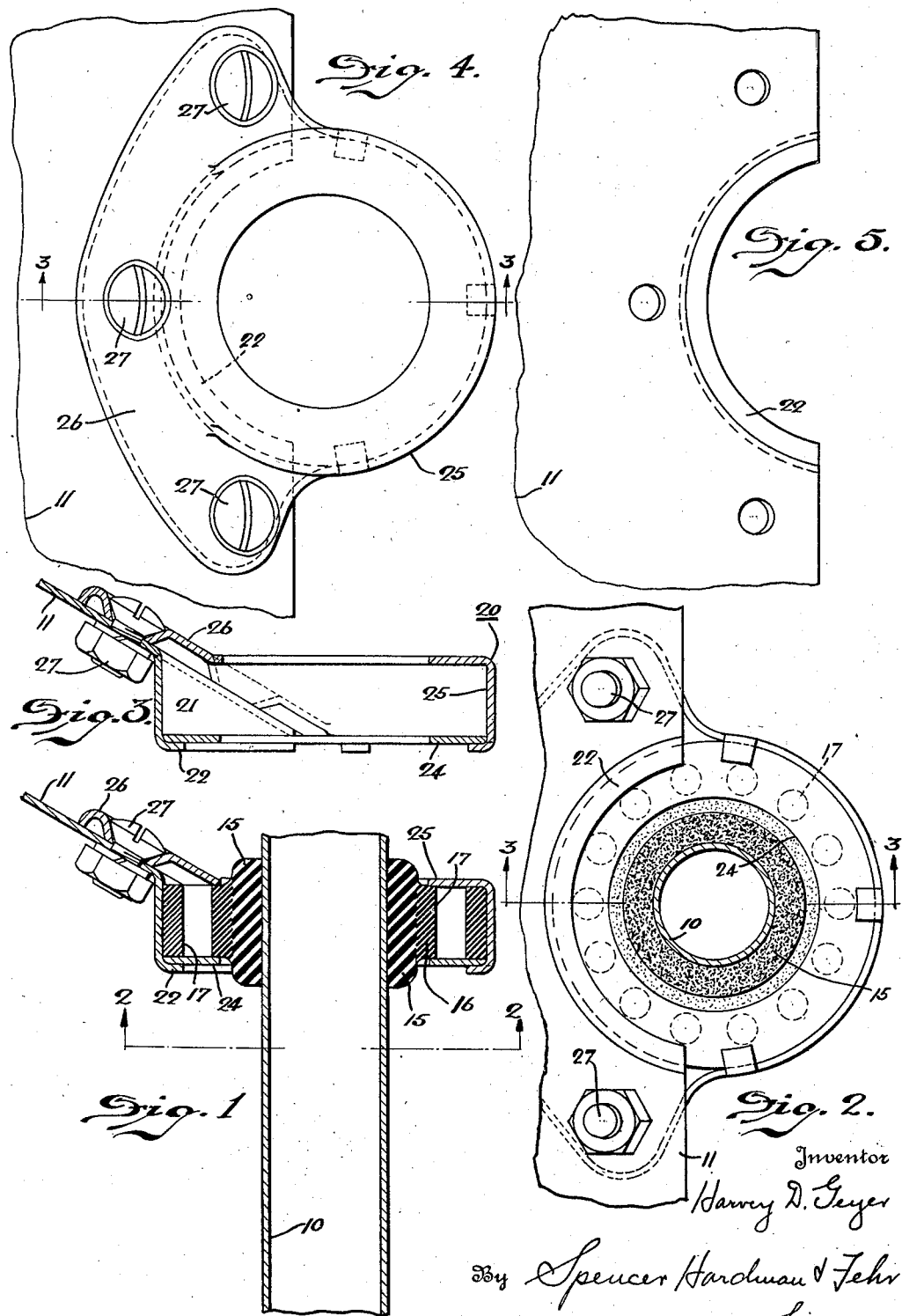
Inventor
Harvey D. Geyer
By Spencer Hardman & Fehr
his Attorneys Patented Aug. 25, 1931

1,820,220

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL AND SHAFT ASSEMBLY

Application filed July 2, 1928. Serial No. 289,698.

This invention relates to a non-metallic vibration dampening bearing support for the steering shaft of automotive vehicles and the like.

An object of the invention is to provide a resilient vibration dampening bearing support for the steering shaft at the point where it passes through or adjacent to the instrument board of the vehicle, whereby the yielding of the bearing will prevent any binding of the steering shaft therein in case of any weaving or distortion of the vehicle body and whereby also vibrations of the steering shaft are minimized.

Further objects and advantages of the present invention will be apparent from the following description, reference being had to the accompanying drawings, wherein a preferred embodiment of one form of the present invention is clearly shown.

Fig. 1 shows a center line section through a portion of an automobile steering shaft and a stationary resilient bearing support therefor at the point where it passes adjacent the instrument panel.

Fig. 2 is a bottom view of the resilient bearing taken on the line 2—2 of Fig. 1.

Fig. 3 illustrates the construction of the pressed metal casing with the resilient rubber member and the steering shaft omitted, the section being taken on line 3—3 of Fig. 2.

Fig. 4 is a view looking directly down on Fig. 3.

Fig. 5 shows how the pressed metal instrument panel is shaped to form part of the metal casing enclosing the resilient rubber member.

Similar reference characters refer to similar parts throughout the several views of the drawings.

Numeral 10 designates a tubular form of steering shaft which is to be used in the ordinary well known steering mechanism construction for automobiles. Numeral 11 designates the pressed metal instrument panel of the automobile adjacent the lower edge of which the steering shaft 10 passes at an inclination such as shown in Fig. 1.

This invention provides a resilient non-metallic bearing support for shaft 10, which bearing support is mounted upon the lower edge of the instrument panel. The upper end of the steering shaft projects as a cantilever quite a distance beyond this resilient bearing support and hence the upper end of the shaft and its attached steering wheel may be subject to serious vibrations due to this long cantilever effect. The resilient non-metallic material of this bearing support reduces and dampens out the steering shaft vibrations by absorbing the energy of the vibrations and preventing the vibrations from building up to large or serious amplitudes.

This resilient bearing support is illustrated in the drawings in its preferred form. 15 is a sleeve portion of hard rubber compounded with graphite which contacts with the shaft 10 and forms a bearing surface therefor. This relatively hard sleeve 15 has integrally molded and firmly bonded therewith the outwardly projecting annular flange portion 16 of relatively soft resilient rubber. Flange 16 preferably has a series of holes 17 molded therein to increase the yieldability of this soft rubber flange. Flange 16 is encased within and supported by the annular metal housing 20 which is clearly illustrated in section in Fig. 3. This housing 20 is formed partly by shaping the adjacent portion of instrument panel 11 to form therein the arced recess 21 having the bentover flange 22 at its lower edge as clearly shown in Figs. 3, 4 and 5. A separate pressed sheet metal part 25 is fitted to the panel 11 in complementary relationship to the arc-shaped recess 21 to form together with the annular bottom disc 24 the annular housing 20. Metal part 25 is provided with a heavy crowned flange 26 which is rigidly bolted to panel 11 by the three bolts 27 to form a rigid support for the housing 20. The soft rubber flange 16 is snugly confined within housing 20, being somewhat compressed when the bolts 27 are set up tight. (See Fig. 1). When this is done the holes 17 are substantially closed off by the bottom annular disc 24 and by the metal stamping 25 at the top thereof to trap air within holes 17 and thereby increase the yieldability and resilience of the soft rubber flange 16, as will be obvious from Fig. 1.

It will now be obvious that the relatively hard bearing sleeve 15 is yieldably supported in position by soft rubber which isolates the steering shaft from its support 11 and substantially prevents vibrations from being transmitted between shaft 10 and panel 11. The yielding of the soft rubber will also prevent possibility of the relatively rigid sleeve 15 binding on the shaft 10 during the ordinary weaving of the car body. This invention therefore permits an unhoused steering shaft to be supported by a bearing at the instrument panel and eliminates all tendency to bind at this bearing due to distortion of the car body.

While the form of embodiment of the present invention as herein disclosed, constitutes a preferred form, it is to be understood that other forms might be adopted, all coming within the scope of the claims which follow.

What is claimed is as follows:

1. In a steering mechanism for automotive vehicles and the like, in combination, an unhoused rotatable steering shaft, a resilient vibration dampening bearing for said shaft intermediate the end portions thereof, said bearings comprising: a relatively hard rubber sleeve portion forming the bearing surface for said shaft, a radially outwardly projecting peripheral flange of relatively soft rubber bonded by vulcanization to said sleeve portion, and a metal housing encasing the outer portion of said peripheral flange and forming a support therefor, and a stationary support upon which said housing is mounted.

2. In a steering mechanism for automotive vehicles and the like, in combination, an unhoused rotatable steering shaft, a resilient vibration dampening bearing for said shaft intermediate the end portions thereof, said bearing comprising: a relatively hard rubber sleeve portion forming the bearing surface for said shaft, a radially outwardly projecting peripheral flange of relatively soft rubber bonded by vulcanization to said sleeve portion, and a metal housing bracket encasing the outer portion of said peripheral flange and forming a support therefor, said soft rubber flange having a plurality of voids molded therein whereby to increase the yieldability of said flange.

3. In a steering mechanism for automotive vehicles and the like, in combination, an unhoused rotatable steering shaft, a resilient vibration damping bearing for said shaft intermediate the end portions thereof, said bearing comprising: a relatively hard rubber sleeve portion forming the bearing proper, a relatively soft rubber annulus of less axial length than said sleeve portion surrounding and yieldably supporting said sleeve portion, and a stationary metal housing bracket having top and bottom flanges thereon retaining and supporting the outer portion only of said soft rubber annulus, whereby to provide a fixed yieldable support for said hard rubber sleeve portion.

In testimony whereof I hereto affix my signature.

HARVEY D. GEYER.